(12) United States Patent
Yellin et al.

(10) Patent No.: US 7,660,289 B2
(45) Date of Patent: Feb. 9, 2010

(54) SYSTEM, APPARATUS AND METHOD OF VARYING CHANNEL BANDWIDTH

(75) Inventors: Daniel Yellin, Ra'anana (IL); Sharon Levy, Hadera (IL); Yona Perets, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 11/124,586

(22) Filed: May 9, 2005

(65) Prior Publication Data

US 2006/0252389 A1 Nov. 9, 2006

(51) Int. Cl.
*H04Q 7/00* (2006.01)

(52) U.S. Cl. .................. 370/344; 370/332; 370/337; 455/450

(58) Field of Classification Search .............. 370/332, 370/337, 328, 344, 342; 455/452.2, 450; 343/792

See application file for complete search history.

(56) References Cited

U.S. PATENT DOCUMENTS

| | | | |
|---|---|---|---|
| 5,101,501 A | 3/1992 | Gilhousen et al. | |
| 5,625,876 A | 4/1997 | Gilhousen et al. | |
| 2003/0036385 A1* | 2/2003 | Uehara et al. | ............... 455/437 |
| 2003/0169824 A1* | 9/2003 | Chayat | ......................... 375/260 |
| 2004/0113858 A1* | 6/2004 | Tsai et al. | ................... 343/792 |
| 2004/0176033 A1* | 9/2004 | Tamaki et al. | ................. 455/59 |
| 2005/0031047 A1 | 2/2005 | Maltsev et al. | |
| 2005/0152466 A1* | 7/2005 | Maltsev et al. | .............. 375/260 |

FOREIGN PATENT DOCUMENTS

EP 1 411 647 A 4/2004

OTHER PUBLICATIONS

International Search Report for PCT/US2006/016649 International Filing Date Apr. 28, 2006, Date Mailed Sep. 9, 2006.
Cheong Yui Wong et al: "Multiuser OFDM with Adaptive Subcarrier, Bit, and Power Allocation" IEEE Journal on Selected Areas in Communications, IEEE Service Center, Piscataway, US, vol. 17, No. 10 Oct. 1999, XP011055027.
3GPP TSG RAN WG1 #37, "Modeling of Performance with Coloured Interference Using the EESM (Exponential Effective Sir Mapping)", NORTEL Networks, Montreal, Quebec, Canada, May 10-14, 2004, pp. 1-9.

* cited by examiner

*Primary Examiner*—Danh C Le
(74) *Attorney, Agent, or Firm*—Pearl Cohen Zedek Latzer, LLP

(57) ABSTRACT

Briefly, a wireless communication system having two or more wireless communication devices. The wireless communication device includes a transmitter to transmit a signal over a wireless channel and to determine a bandwidth of the wireless channel and a power level of the signal based on a quality value of the wireless channel. A method of varying the bandwidth of the wireless channel is also provided.

23 Claims, 2 Drawing Sheets

SYSTEM, APPARATUS AND METHOD OF VARYING CHANNEL BANDWIDTH

BACKGROUND OF THE INVENTION

In some wireless communication systems, for example, cellular communication systems such as, for example Wideband Code Division Multiple Access (WCDMA) and/or Code Division Multiple Access (CDMA) systems, a soft hand-off (SHO) mechanism may be used to transit from one servicing station to several servicing stations or from several servicing stations to a single servicing stations. For example, such a mechanism is used in commercial CDMA cellular networks such as, for example, those operating under the TIA/EIA IS-95 standard published in 1993, ITU standard IMT 2000-CDMA2000, WCDMA networks, and the like. Similar mechanisms have been developed for some Orthogonal Frequency Division Multiplexing (OFDM) systems. For example, the IEEE 802.16e WirelessMAN® standard defines a mechanism where two or more base stations may transmit the same signal to a specific user. The transmitted signals from these two or more base stations may be synchronized in time such that the delay between the received signals of the different base stations may occur within a time interval which is shorter than the cyclic prefix interval.

In an OFDM based cellular network, a receiver may perform maximal ratio combining over an equivalent channel that may contain combined channel responses from multiple base stations of the cellular network.

Unfortunately, SHO may have a number of drawbacks. Some disadvantages of SHO include increased network complexity, increased round trip delay and increased complexity of the mobile terminal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
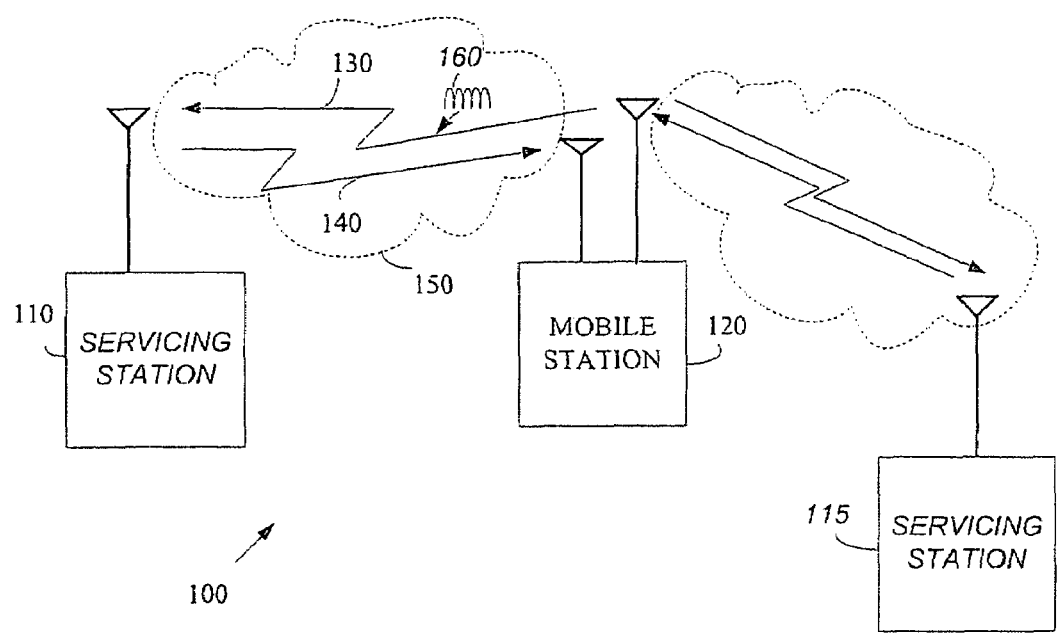
FIG. 1 is a schematic block diagram of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, wireless metropolitan area network (WPAN) stations or the like. Portable communication devices intended to be included within the scope of the present invention may include, by a way of example only, cellular radiotelephone portable communication devices, digital communication system portable devices, and the like.

The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. According to embodiments of the present invention wireless communication system 100 may include and/or may be at least one of a first generation cellular system, a second generation cellular system, a third generation cellular system, a fourth generation cellular system, a wireless local area system, a wireless metropolitan area system such as, for example, WiMAX, or the like.

According to this exemplary embodiment of the invention, wireless communication system 100 may include a plurality of wireless communication devices, for example, a servicing station and/or a plurality of servicing stations, e.g., servicing stations 110, 115 and a mobile station e.g., mobile station 120 and/or a plurality of mobile stations, if desired.

Although the scope of the present invention is not limited in this respect, links, such as for example, an uplink and a downlink, may be used to transfer communications between servicing stations 110, 115 and mobile station 120. An uplink 130 may transfer communications from mobile station 120 to servicing station 110, and a downlink 140 may transfer communications from servicing station 110 to mobile station 120. Additionally, uplink 130 and downlink 140 may include one or more sub-channels, which may be used for voice and data transportation. Furthermore, sub-channels may include plurality of sub-carriers to carry signals, for example pilot signals, coded signals, data signals, and the like. The sub-carriers may include symbols. Mobile station 120 may include one or more antennas and may receive pilot signals from the base stations 110 via the one or more antenna.

Although the scope of the present invention is not limited in this respect, wireless communication device, e.g., mobile station 120, may transmit a signal 160 over a wireless channel 150 in a variable channel bandwidth wherein the channel bandwidth may be set according to a wireless channel quality value. For example, a channel quality value may include a signal to noise ration (SNR) value, a signal to interference ratio (SIR) value, a Carrier-to-Interference Ratio (CIR) value and/or may be a function of path loss, if desired.

According to embodiments of the present invention, the path loss may be defined as a ratio between a power level of a signal (e.g. signal 160) at the transmitter signal 160 and a power level of a signal at the receiver. The path loss may depend on the signal propagation over the wireless channel (e.g. wireless channel 150) between the transmitter and receiver. The loss of power may increase with distance between the transmitter and receiver, e.g. the distance between servicing station 110 and mobile station 120.

Although the scope of the present invention is not limited in this respect, signal 160 may be an OFDM signal which may include sub channels, which may include the sub-carriers, for example 1536 sub-carriers, if desired. For example, in some exemplary embodiments of the invention, the sub-carriers may include a pilot carrier and data carriers. In addition, in the wireless communication art, the sub-channels may be referred to as frequency bins. For example, the channel bandwidth may be divided into sub-channel bands. In various exemplary embodiments of the invention the channel bandwidth may be, for example, approximately 1.25 Mega Hertz (MHz), 2.5 MHz, 5 MHz, 10 MHz, 15 MHz, or 20 MHz, if desired.

Figure 2:
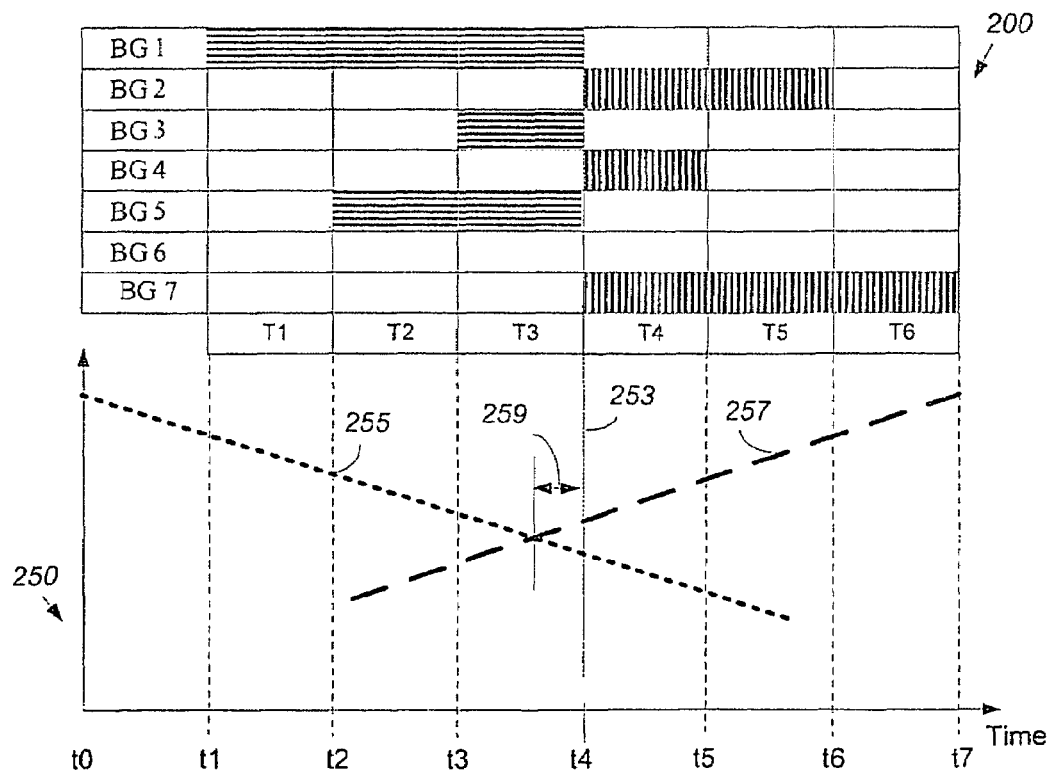
FIG. 2 is an illustration of a timing diagram of an OFDM signal scheme and a corresponding hand-off of a mobile station transiting from one servicing station to another servicing station based on a wireless channel quality value according to some exemplary embodiments.

Turning to FIG. 2, an illustration of a timing diagram of an OFDM signal scheme 200 and a corresponding hand-off of a mobile station transiting from one servicing station to another servicing station based on a wireless channel quality value according to some exemplary embodiments of the invention is shown. Although the scope of the present invention is not limited in this respect, OFDM signal scheme 200 may be described in relation to time intervals T1 to T6 and sub-channels and/or bin groups (BG) BG 1 to BG 6. A hand-off diagram 250 shows a channel quality value 255 (dotted line), for example, an average CIR per bin value of downlink 140 of service station 110, and a channel quality value 257 (dashed line), for example, an average CIR per bin value of the downlink of service station 115, as a function of time.

According to some exemplary embodiments of the invention, mobile station 120 may roam from a coverage area of servicing station 110 to a coverage area of servicing station 115 and may transit from servicing station 110 to servicing station 115, for example, based on the average CIR per bin value, if desired. Servicing stations 110 and 115 may vary the bandwidth of the wireless channel by increasing or decreasing the number of sub-channels (e.g. bins), e.g., based on a quality value of the servicing stations. According to some embodiments of the invention, the sub-channel may be transmitted in a constant power level. Thus, varying the number of transmitted sub-channels may have affect the transmitted power level. In some embodiment of the invention the transmitted power level may vary based on the channel quality value, if desired. According to other embodiments of the invention, the total transmit power may be constant and, thus, the sub-channel power may be generally proportional to the number of transmitted sub-channels.

According to some other embodiments of the invention, the bandwidth may be varied by varying the number of sub-carriers per transmission time interval (TTI), e.g., T1, T2 and etc. For example, in one embodiment of the invention, 27 OFDM symbols and 299 bins per TTI, e.g., a total of 8073 bins per TTI, may be used. A mobile station that includes 5 codes and uses, for example, a modulation code scheme 1 (MCS 1) may use 2400 sub-carriers out of 8073. According to this example, each sub-carrier may include an average of 3.3 symbols. Furthermore, increasing the transmission rate to 4800 bins per TTI may increase the bandwidth by 100%, although the scope of the present invention is not limited in this respect.

According to this exemplary embodiment of the invention, time interval T1 may span from t1 to t2, time interval T2 may span form t2 to t3, time interval T3 may span from t3 to t4, time interval T4 may span from t4 to t5, time interval T5 may span from t5 to t6, and time interval T6 may span from t6 to t7. During time interval T1 the average CIR per bin value (e.g., dashed line 255) is relatively high and servicing station 110 may transmit modulated symbols on sub-channel BG 1 in a desired channel coding. For example, the desired channel coding may include a high symbol rate such as, for example, rate ⅓ at turbo or convolution code punctured to approximate ¾ rate. During time interval T2 the average CIR per bin value may decrease, and servicing station 110 may increase the rate of transmitted modulated symbols to fill the sub-channels of BG 1 and BG 3 in a stronger channel coding (e.g. rate ½), if desired. As is shown, during time interval T2 mobile station 120 may enter into the coverage area of servicing station 115, whose average CIR per bin value 257 is lower then average CIR per bin value 255 of servicing station 110. A hysteresis 259 may be set to determine the transit from one service station to another service station. During time interval T3, average CIR per bin value 255 may be further decreased and servicing station 110 may transmit more modulated symbols on sub-channels BG 1, BG 3 and BG 5, applying different channel coding to the transmitted symbols, if desired. According to this example, at a certain point during time interval T3 average CIR per bin value 257 of servicing station 115 may become higher then average CIR per bin value 255 of servicing station 110. Thereafter, e.g., at time t4, mobile station 120 may be transited from servicing station 110 to servicing station 115, as indicated by dotted line 253, although the scope of the present invention is in no way limited to this respect Although the scope of the present invention is not limited in this respect, several criterions may be applied to evaluate a transit of the mobile station from one servicing station to another servicing station. For example, considering the CIR value of the least effective sub-carrier being used, long term averaging of the instantaneous CIR, calculating an Exponential Effective SIR Mapping (EESM) value, and the like.

Although the scope of the present invention is not limited in this respect, the EESM may be defined as:

$$SIR_{eff} = -\beta \ln\left(\frac{1}{N_u}\sum_{k}^{N_u} e^{-\frac{\gamma_k}{\beta}}\right)$$

where $\gamma_k$ is the SIR for the $k^{th}$ subcarrier, $\beta$ is a parameter optimized according to the wireless link (e.g., downlink), and $N_u$, may specify the number of OFDM subcarriers that are being used to estimate the effective SIR for transmission over a link.

After transiting (e.g. hand-over) according to at least one of the above described criterions, e.g., during time interval T4, servicing station 115 may transmit OFDM symbols over a wide bandwidth, e.g., sub-channels BG 2, BG 4 and BG 6, e.g., at a relatively low rate, if desired. During time intervals T5 and T6 servicing station 115 may narrow the bandwidth of the wireless channel being used, e.g., the bandwidth of wireless channel 150 used by the signal 160, by decreasing the transmitted number of sub-channels, if desired Although the scope of the present invention is not limited in this respect, in some embodiments of the invention the wireless communication system may include two or more user devices, for example, two or more mobile stations. According to this example servicing stations 110 and 115 may allocate different OFDM sub-channels to different user devices. For example sub-channel BG 1 may be allocated to one user (e.g. mobile station 120) and sub-channel BG 9 to another user, and the like. Furthermore, servicing stations 110, 115 may adjust the channel bandwidth of a given user by allocating to the user a number of sub-channels related to the user's channel quality value.

According to some others embodiments of the invention the wireless communication system may be a cellular communication system that may includes two or more cells, and the servicing stations may allocate a required number of OFDM sub-channels at or near an edge of a communication coverage area of the cell, if desired. For example, the servicing station may transmit three or more sub-channels to a user near the edge of the cell, and a single sub-channel to a user near the location of the servicing station, if desired. According to embodiments of the present invention, servicing stations may control transmitted OFDM signal parameters such as, for example, transmitted power level, modulation scheme, channel coding scheme and redundancy of OFDM symbols, e.g., according to a distance of the user (e.g. mobile station) from the servicing station.

Although the scope of the present invention is not limited in this respect, servicing stations and/or mobile stations may transmit sub-channels with sufficient spacing therebetween so that the fading of one sub-channel may not be correlated with the fading of other sub-channels. For example, sub-channels BG 1, BG 3, and BG 5 may be sufficiently spaced apart so that their respective fading may not be inter-correlated.

It should be understood that although the method of varying the bandwidth of the channel is described herein with reference to a servicing station transmitting over a downlink, the method is also applicable to a station, e.g., a mobile station, transmitting over an uplink. According to this embodiment, the mobile station may transmit over the uplink sub-carriers with frequency hopping between the sub-carriers, although the scope of the present invention is not limited in this respect. Additionally or alternatively, there may be several ways to gather sub-carriers into groups. This may be done by gathering sub-carriers with close frequencies, and/or by gathering sub-carriers with interleaved frequencies; however, the scope of the present invention is not limited to these examples and other ways may be used to gather sub-carriers into groups.

Figure 3:
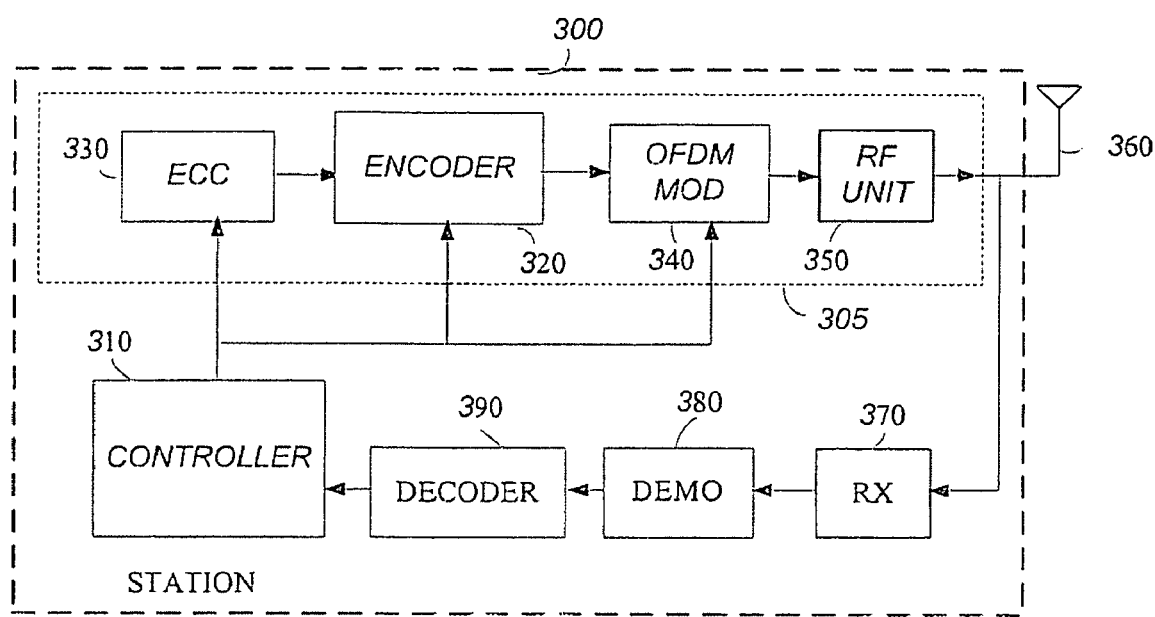
FIG. 3 is a block diagram of a wireless communication device according to an exemplary embodiment of the present invention.

Turning to FIG. 3 a block diagram of a wireless communication device 300 according to exemplary embodiments of the invention is shown. Although the scope of the present invention is not limited in this respect, wireless communication device 300 (e.g. a mobile station and/or a servicing station) may include a controller 310, a transmitter (TX) 305, at least one antenna 360, a receiver 370, a demodulator 380, and a decoder 390. According to exemplary embodiments of the invention transmitter 305 may include an encoder (ENC) 320, an error correction channel coder (ECC) 330, an OFDM modulator 340, and a radio frequency (RF) unit 350.

Although the scope of the present invention is not limited in this respect, antenna 360 may include two or more antennas of a desired type, for example, a dipole antenna, an internal antenna, a monopole antenna or the like. In some embodiments, the receiver and the transmitter may use different antennas.

Although the scope of the present invention is not limited in this respect, controller 310 may generate data bits. Encoder 320, which may be, for example, a turbo encoder, a convolution encoder, a linear block code encoder or the like, may encode the data bits into symbols. ECC 330 may provide an error correction code block, which may be adapted according to on an allocated number of the OFDM sub-channels and a selected modulation scheme the encoded signal. Controller 310 may measure a channel quality value from a received signal and may allocate one or more sub-channels to transmit the encoded and error corrected signal. OFDM modulator 340 may modulate symbols of the encoded signal to one or more sub-carriers of the allocated sub-channels. RF unit 350 may modulate the encoded signal with a radio frequency (RF) signal to be transmitted via antenna 360, if desired.

Although the scope of the present invention is not limited in this respect, OFDM modulator 340 may be able to modulate the symbols according to modulation schemes such as, for example binary phase shift keying (BPSK), quadrature phase shift keying (QPSK), quadrature-amplitude modulation (QAM) with different order such as, for example, QAM16, QAM32, QAM64, QAM18, QAM256 and the like, differential BPSK (DBPSK), differential QPSK (DQPSK), and the like. Furthermore, OFDM modulator 340 may assign the modulated symbols (e.g. 16-QAM QPSK BPSK) into predefine sub carriers within the sub-channels, if desired.

According to some embodiments of the present invention, receiver (RX) 370 may receive a signal (e.g., OFDM signal) from via antenna 360. Demodulator 380, for example, an OFDM demodulator, may demodulate the signal to provide OFDM symbols. Decoder 390 may decode the symbols and controller 310 may generate a wireless channel quality value (e.g. average CIR per bin) from the decoded symbols, if desired. Furthermore, the decoded symbols may include instructions or requests such as, for example, "allocate X sub-channels", wherein X may be an integer number or a specific bin group number, and controller 310 may be able to allocate the requested sub-channels according to the instruction.

It should be understood that according to some embodiments of the invention wireless communication device 300 may include a mobile station and according to other embodiments of the invention wireless communication device 300 may include a servicing station. Furthermore, it should be understood that the blocks of wireless communication device 300 may be implemented by hardware, by software and/or any combination of hardware and software.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
a transmitter to transmit a plurality of Orthogonal Frequency Division Multiplexing (OFDM) sub carriers gathered in one or more sub channels over a wireless channel, the wireless channel including a downlink, wherein, the transmitter is to determine a bandwidth of the wireless channel by increasing or decreasing the number of the one or more sub channels and to determine a power level of a sub channel of the one or more sub channels based on a quality value of the wireless channel; and
a controller capable of controlling the wireless channel bandwidth by allocating a number of OFDM sub-channels related to a quality value of the downlink wherein the sub-channels include bins and the quality value is an average Carrier-to-Interference ratio (CIR) per bin.

2. The apparatus of claim 1, wherein the transmitter comprises:
an Orthogonal Frequency Division Multiplexing modulator to provide symbols to sub-carriers of a sub-channel of the one or more sub channels.

3. The apparatus of claim 1, wherein the controller is capable of allocating different Orthogonal Frequency Division Multiplexing sub-channels to different user devices receiving signals from the transmitter over respective wireless links.

4. The apparatus of claim 3, wherein the controller is capable of allocating two or more sub-channels to two or more different user devices, respectively, based on the average Carrier-to-Interference ratio (CIR) per bin values of the two or more users devices.

5. The apparatus of claim 1, wherein the transmitter is capable of increasing the power level by transmitting a required number of Orthogonal Frequency Division Multiplexing sub-channels to user devices near an edge of a communication coverage area of the transmitter in a cell of a cellular system.

6. The apparatus of claim 1, wherein the transmitter comprises:
an error correction channel coder to provide an error correction code block wherein the error correction code block is adapted based on an allocated number of Orthogonal Frequency Division Multiplexing sub-channels.

7. The apparatus of claim 1, comprising:
a receiver to receive a signal over the wireless channel, wherein the controller is able to generate the quality value of the wireless channel according to the received signal.

8. The apparatus of claim 1, wherein the wireless channel includes a downlink and an uplink and the apparatus comprises:
a controller to provide a variable number of Orthogonal Frequency Division Multiplexing sub-channels according to an instruction received over the downlink.

9. method of controlling a power level of a signal comprising:
varying a bandwidth of a wireless channel, the wireless channel including a downlink, by in creasing or decreasing a number of one or more sub channels based on a quality value of the wireless channel; and
transmitting by a transmitter over the wireless channel the one or more sub-channels which include a plurality of Orthogonal Frequency Division Multiplexing (OFDM) sub; and
transmitting over said wireless channel one or more sub-channels from a first servicing station to a second servicing station based on the channel quality value of the downlink wherein the sub-channels include bins and the quality value is an average Carrier-to-Interference ratio (CIR) per bin.

10. The method of claim 9, comprising:
transmitting over said wireless channel one or more sub-channels including one or more symbols; and
increasing the number of sub-channels of said wireless channel based on the channel quality value, wherein the sub-channels include bins and the channel quality value is an average Carrier-to-Interference ratio (CIR) per bin.

11. The method of claim 9, wherein varying the bandwidth comprises:
setting a required number of sub-channels according to the channel quality value; and
transmitting within a time interval of an Orthogonal Frequency Division Multiplexing (OFDM) signal a number of sub-channels corresponding to said required number of sub-channels.

12. The method of claim 11, comprising:
selecting the required number of sub-channels with sufficient spacing therebetween to provide substantially no correlation of the fading between the selected sub-channels.

13. The method of claim 9, comprising:
transmitting a sub-channel with a constant power level.

14. The method of claim 9, comprising:
adjusting a coding rate of symbols of an Orthogonal Frequency Division Multiplexing (OFDM) signal transmitted over said channel based on the allocated number of sub-channels.

15. The method of claim 14, comprising:
transmitting one or more symbols of the Orthogonal Frequency Division Multiplexing (OFDM) signal with carrier hopping between the symbols.

16. The method of claim 15, wherein transmitting the one or more symbols of the Orthogonal Frequency Division Multiplexing (OFDM) signal comprises transmitting the one or more symbols over an uplink of said wireless communication channel.

17. A wireless communication device comprising:
a dipole antenna operably coupled to a transmitter to transmit a plurality of Orthogonal Frequency Division Multiplexing (OFDM) sub carriers gathered in one or more sub channels over a wireless channel, the wireless channel including a downlink, wherein the transmitter is to determine a bandwidth of the wireless channel by increasing or decreasing the number of the one or more sub channels and to determine a power level of a sub channel of the one or more sub channels based on a quality value of the wireless channel; and
a controller capable of controlling the wireless channel bandwidth by allocating a number of Orthogonal Frequency Division Multiplexing sub-channels related to a quality value of the downlink, wherein the sub-channels include bins and the quality value is an average Carrier-to-Interference ratio (CIR) per bin.

18. The wireless communication device of claim 17, wherein the transmitter comprises:
an Orthogonal Frequency Division Multiplexing modulator to provide symbols to sub-carriers of a sub-channel of the one or more sub channels.

19. The wireless communication device of claim 17, wherein the controller is capable of allocating two or more sub-channels to two or more different user devices, respectively, based on the average Carrier-to-Interference ratio (CIR) per bin values of the two or more users devices.

20. The wireless communication device of claim 17, wherein the transmitter is capable of increasing the power level by transmitting a required number of Orthogonal Frequency Division Multiplexing sub-channels to user devices near an edge of a communication coverage area of the transmitter in a cell of a cellular system.

21. The wireless communication device of claim 17, comprising:
an error correction channel coder to provide an error correction code block wherein the error correction code block is adapted based on an allocated number of Orthogonal Frequency Division Multiplexing sub-channels.

22. The wireless communication device of claim 17, comprising:
a receiver to receive a signal over the wireless channel, wherein the controller is able to generate the quality value of the wireless channel according to the received signal.

23. The wireless communication device of claim 17, wherein the wireless channel includes a downlink and an uplink and comprises:
a controller to provide a variable number of Orthogonal Frequency Division Multiplexing sub-channels according to an instruction received over the downlink.

* * * * *